(12) United States Patent
Martinet et al.

(10) Patent No.: US 7,326,493 B2
(45) Date of Patent: Feb. 5, 2008

(54) LITHIUM ELECTROCHEMICAL GENERATOR COMPRISING AT LEAST A BIPOLAR ELECTRODE WITH CONDUCTIVE ALUMINIUM OR ALUMINIUM ALLOY SUBSTRATES

(75) Inventors: Sébastien Martinet, Grenoble (FR); Frédéric Le Cras, Combe Bougey (FR)

(73) Assignee: Commissariat a l'Energie Atomique, Paris (FR)

( * ) Notice: Subject to any disclaimer, the term of this patent is extended or adjusted under 35 U.S.C. 154(b) by 665 days.

(21) Appl. No.: 10/495,733

(22) PCT Filed: Nov. 27, 2002

(86) PCT No.: PCT/FR02/04066

§ 371 (c)(1),
(2), (4) Date: May 14, 2004

(87) PCT Pub. No.: WO03/047021

PCT Pub. Date: Jun. 5, 2003

(65) Prior Publication Data

US 2005/0069768 A1 Mar. 31, 2005

(30) Foreign Application Priority Data

Nov. 28, 2001 (FR) .................. 01 15377

(51) Int. Cl.
*H01M 4/04* (2006.01)
*H01M 4/66* (2006.01)
(52) U.S. Cl. ...................... 429/210; 429/245
(58) Field of Classification Search ............ 429/210, 429/245
See application file for complete search history.

(56) References Cited

U.S. PATENT DOCUMENTS

| 3,740,270 A * | 6/1973 | Bilhorn .................. 429/162 X |
| 5,254,415 A | 10/1993 | Williams et al. |
| 6,780,543 B2 * | 8/2004 | Yoshimura et al. ..... 429/233 X |
| 7,163,765 B2 * | 1/2007 | Hosaka et al. .......... 429/210 X |

FOREIGN PATENT DOCUMENTS

WO   WO 96/12314   4/1996

OTHER PUBLICATIONS

Marsh, R.a. et al.: "Bipolar Lithium-Ion Battery Development", Journal of Power Sources, Elsevier Sequoia S.a., Lausanne, CH, vol. 65, No. 1, Mar. 1, 1997, pp. 133-141.

* cited by examiner

*Primary Examiner*—Stephen J. Kalafut
(74) *Attorney, Agent, or Firm*—Pearne & Gordon LLP

(57) ABSTRACT

The subject of the present invention is a lithium electrochemical generator comprising two peripheral electrodes—one positive and the other negative—each comprising an electrically conductive substrate (13, 21) and an active layer (14, 20) that includes an active material, at least one bipolar electrode comprising a positive active layer (18) on a first electrically conductive substrate and a negative active layer (16) on a second electrically conductive substrate, the said substrates being fixed together and two separators (15, 19) flanking each bipolar electrode, in which generator the electrically conductive substrates of each bipolar electrode are made of identical or different materials chosen from aluminium and its alloys and the negative active material of the bipolar electrode prevents an aluminium alloy being obtained with the electrically conductive substrates, under the operating conditions of the storage battery.

19 Claims, 4 Drawing Sheets

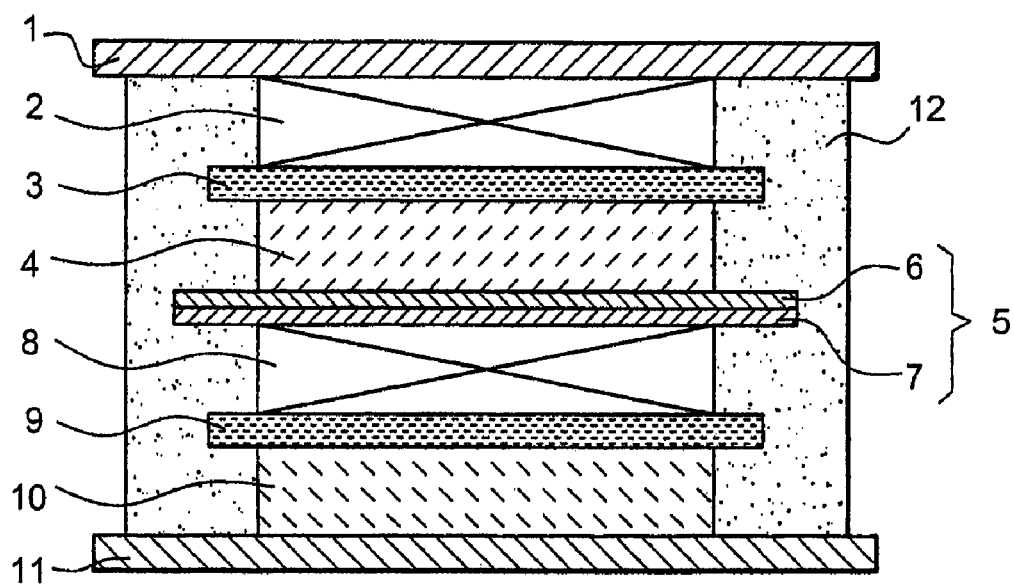
PRIOR ART    FIG. 1
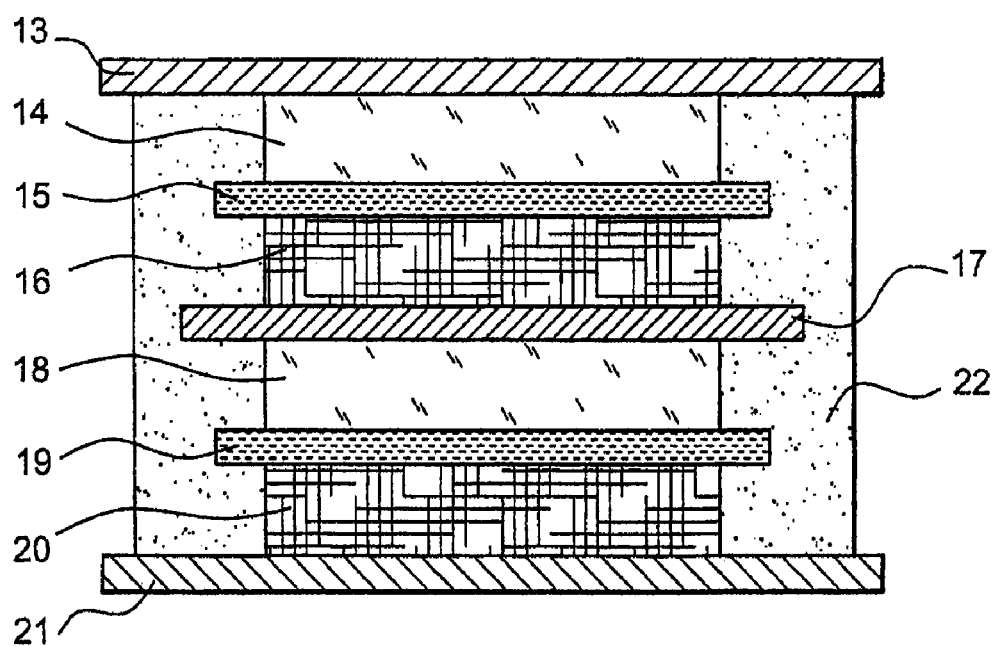
FIG. 2

LITHIUM ELECTROCHEMICAL GENERATOR COMPRISING AT LEAST A BIPOLAR ELECTRODE WITH CONDUCTIVE ALUMINIUM OR ALUMINIUM ALLOY SUBSTRATES

TECHNICAL FIELD

The present invention relates to a lithium electrochemical generator comprising at least one bipolar electrode.

The general field of the invention may be defined as that of lithium electrochemical generators.

These electrochemical generators operate on the principle of lithium insertion or extraction (or intercalation/decentralization) on at least one electrode.

Specifically, the electrochemical reaction at the origin of current production involves the transfer of lithium cations via a electrolyte conductive of lithium ions, the said cations coming from a negative electrode either being intercalated into the accepter network of the positive electrode or resupplying the electrolyte with lithium ions.

Lithium electrochemical generators have rapidly become the subject of considerable development owing to their good results obtained in terms of voltage, energy density per unit mass and energy density per unit volume relative to lead storage batteries or storage batteries of the nickel-cadmium (Ni—Cd) or nickel-metal hydride (Ni-MH) type.

Owing to these very attractive characteristics, such electrochemical generators are finding their application in many fields, especially in supplies for thin on-board systems, such as credit cards and smart labels, in supplies for mobile telephones, or else in supplies for electric vehicles.

STATE OF THE ART

The first lithium storage batteries comprised lithium metal at their negative electrodes, thereby providing a high voltage and excellent energy densities per unit mass and per unit volume. However, research has revealed that repeated recharging of this type of storage battery is ineluctably accompanied by the formation of lithium dendrites, which usually cause the separator, including the electrolyte, to deteriorate.

To overcome the problems of instability, safety and lifetime that are inherent to the presence of metallic lithium in lithium storage batteries, research efforts have been redirected towards a non-metallic lithium storage battery in which lithium is inserted into the negative electrode.

In storage batteries of this type, a distinction is made, depending on the constitution of the electrolyte, between lithium-ion storage batteries with a liquid electrolyte and lithium-ion storage batteries with a solid-state or gelled electrolyte of the polymer type.

In these two variants, the negative electrode is generally based on a carbon material, such as graphite or graphitizable or non-graphitizable carbon, and is supported by a copper foil, for example 15 to 18 μm in thickness.

The positive electrode is generally based on a lithiated transition metal oxide of the $LiMO_2$ type, where M denotes Co, Ni, Mn and other transition metals and is generally supported by an aluminium foil, typically around 20 μm in thickness. This electrode may also be one based on active carbon with a high specific surface area.

In the charging process, the electrochemical reactions are: on the negative electrode:

$$C+xLi^++xe^-\rightarrow Li_xC$$

on the positive electrode:

either: $LiMO_2\rightarrow Li_{1-x}MO_2+xLi^++xe^-$ the lithium ions flowing through a separator that includes the electrolyte;

or: $X^-\rightarrow X+e^-$ if the electrolyte contains a salt of the $Li^+X^-$ type and where X will then be adsorbed on the carbon, in the case of a positive electrode made of active carbon.

In the discharging process, it is the reverse reactions that occur.

As regards the technology involving a liquid electrolyte, the separator generally consists of a microporous film made of polyethylene or polypropylene, or a combination of both, the said film being impregnated with the electrolyte.

The electrodes/separator assembly is itself impregnated with an electrolyte consisting of a solvent, generally of the carbonate family, and of a lithium salt.

In the technology involving a solid-state electrolyte, the separator consists, at least partly, of a gelled or dry polymer electrolyte.

Lithium storage batteries, such as those described above, therefore comprise a negative electrode operating at very low potential, for example 0 V in the case of lithium metal electrodes or 100 mV in the case of carbon electrodes, and this may consequently entail risks of formation of lithium dendrites, especially during rapid charging.

It should be noted that the potentials are given relative to the $Li^+/Li$ reference pair.

This phenomenon contributes in particular to limiting the power performance of lithium storage batteries and their lifetime, and also poses safety problems owing to the risks of internal short circuits. In addition, the fact of using negative active materials at very low potential dictates the use of a current collector material based on copper, which has a high density, for example around 8.96 g/cm³, and this contributes to limiting the energy per unit mass of such a type of storage battery. Moreover, copper is an expensive material.

To improve the low power performance of this type of construction, S. Hossain in U.S. Pat. No. 5,595,839 [1] proposes a cell architecture, shown in FIG. 1, consisting of a stack of electrochemical cells, the junction between adjacent cells being provided by a unitary bipolar structure comprising a positive electrode 8 and a negative electrode 4 respectively, the said electrodes being placed on either side of two substrates fixed together to form an assembly 5, the substrate on the side facing the negative electrode made of a carbon material being a copper substrate 6 and the substrate on the side facing the positive electrode, made of $LiMO_2$, being an aluminium substrate 7. In the case of a stack consisting of two cells, as shown in FIG. 1, the positive terminal of the storage battery is formed from an $LiMO_2$-based electrode 2 on an aluminium foil 1 and the negative terminal is formed from a carbon-based electrode 10 on a copper foil 11 (M having the same meaning as that given above). The positive and negative terminals are electrically isolated from the unitary bipolar structure by microporous separators 3, 9 that are impregnated with liquid electrolyte. The isolation between the cells separated by the bipolar structure is provided by means of a seal 12 based on polytetrafluoroethylene (PTFE).

Although this architecture does allow the power performance of electrochemical generators to be improved, by reducing the internal resistance of the generator, it provides no improvement in terms of energy per unit mass given that the electrochemical generator still contains copper as current collector material.

Moreover, although the dendritic growth and lithium deposition phenomena are reduced by the use of a bipolar electrode, by reducing the internal resistances and consequently by moving the operating potentials of the negative electrodes away from the metallic lithium deposition potential, these phenomena still limit the lifetime and the power performance of the storage battery since the negative carbon electrode still operates, despite a slight improvement, at a potential close to the lithium deposition potential.

It is also important to emphasize that, in all the embodiments of the prior art, lithium storage batteries designed for power applications require specific safety systems such as a cutout, vent or electronic protection circuit in order to meet the safety standards. These safety systems obviously lower the energy performance per unit mass and per unit volume of these storage batteries.

The various lithium storage batteries of the prior art therefore all have a low power level and a short lifetime owing to the formation of lithium dendrites, especially when these storage batteries are being charged. In addition, they all have a low energy per unit mass owing to the use of a copper current collector material on the side facing the negative electrode. Finally, the storage batteries of the prior art are not fail-safe—they require the addition of external safety systems.

SUMMARY OF THE INVENTION

The object of the present invention is to propose a lithium generator that solves the drawbacks of the prior art, especially the low power performance, the insufficiently low energy per unit mass, the limited lifetime and the lack of intrinsic safety of the said generators of the prior art.

To achieve this, the subject of the invention is a lithium electrochemical generator comprising:
- a positive peripheral electrode comprising an electrically conductive substrate to which a positive active layer, including a positive active material, adheres;
- a negative peripheral electrode comprising an electrically conductive substrate to which a negative active layer, including a negative active material, adheres;
- at least one bipolar electrode comprising a positive active layer, including a positive active material, which adheres to a first electrically conductive substrate and comprising a negative active layer, including a negative active material, which adheres to a second electrically conductive substrate, the said first and second substrates being fixed together;
- two separators that are lithium ion conductors but electronic insulators, which flank each bipolar electrode;

the said generator being characterized in that the said first and second electrically conductive substrates of the at least one bipolar electrode are made of identical or different materials chosen from the group formed by aluminium and its alloys and in that the negative active material of the negative active layer of the at least one bipolar electrode is a material not capable of forming an aluminium-lithium alloy with the material of the said second electrically conductive substrate.

According to the invention, it is to be understood that the said first and second substrates are not capable of forming an alloy with the active material with which they are in contact.

According to the invention, it should also be noted that an electrode is an assembly comprising at least one electrically conductive substrate and an active layer having the active material deposited on one face of the said substrate, the said material being tailored to the polarity of the electrode that allows the electrochemical reaction.

Preferably, the first electrically conductive substrate and the second substrate of the at least one bipolar electrode form a single substrate, that is to say a one-piece substrate. According to this particular embodiment, the said substrates are thus in the form of a single piece and not in the form of an assembly of two pieces fixed together.

Whatever the configuration of the said first and second substrates, the bipolar electrode thus comprises a positive active layer and a negative active layer that are placed on the respective opposed faces of a common substrate (this common substrate corresponding to the assembly resulting from the first and second substrates being fixed together or to the abovementioned one-piece substrate).

The present invention therefore has the advantage of providing a lithium electrochemical generator that has, owing to the exclusive use of aluminium or aluminium alloy for making up the electrically conductive substrates (that is to say the first and second substrates according to the invention) of each bipolar electrode, an energy density per unit mass much higher than the systems of the prior art, especially because of the low density of aluminium (2.699 g/cm$^3$).

To obtain this result, it is advantageous to choose a negative active material for each bipolar electrode that is compatible with the said second substrate to which it adheres, that is to say a material whose potential for intercalation of lithium into the said material is higher than the potential for formation of an aluminium-lithium alloy.

Advantageously, the potential for intercalation of lithium into the negative active material of the at least one bipolar electrode is greater than 0.25 V.

It should be noted that according to the invention, the potentials are given with reference to the potential of the Li$^+$/Li pair.

In general, the peripheral electrodes may be of any form, since they have a particular current collector function. They may therefore be produced as described in the prior art, since they do not provide the bipolarity function.

However, it may be advantageous, in order to save further weight, to produce the electrically conductive substrates of the peripheral electrodes from aluminium or an aluminium alloy that are combined with active materials having the same compositions as those used for the bipolar electrode.

Thus, the electrochemical generator according to the invention may also be characterized by the fact that the electrically conductive substrate of at least one of the peripheral electrodes is made of a material chosen from a group consisting of aluminium and aluminium alloys.

The negative active material of each bipolar electrode is preferably Li$_4$Ti$_5$O$_{12}$.

The use of such a negative active material having a potential of 1.55 V, which is around 0.25 V higher than the potential for formation of an aluminium-lithium alloy, prevents, on the one hand, the formation of the said alloy and, on the other hand, the formation of lithium dendrites during high-speed charging.

Consequently, the electrochemical generators according to the invention using in particular such a material have a better lifetime than the conventional lithium-ion systems. In addition, there is no risk of forming dendrites, it is therefore possible to use a thinner and less expensive separator than the separators conventionally used.

Moreover, the use of a less reducing negative active material than the lithium metal of the prior art leads to an improvement in the intrinsic safety owing to the lower reactivity of the said material.

The negative active material may also be chosen from a group consisting of pyrolitic carbon, coke, a lithium-containing metal alloy, a metal chalcogenide or a metal halide, provided that these materials fulfil the requirements of the invention.

Preferably, the positive active material of each bipolar electrode according to the invention is chosen from a group consisting of transition metal phosphates or orthosilicates, carbon, transition metal oxides, whether substituted or not, and mixtures thereof.

According to the invention, the term "transition metal" is understood to mean a metal having an incompletely filled subshell d in the neutral state of the atom or in one of their usual oxidation states. These elements divide into three transition series:
  the first transition series ranging from scandium to zinc;
  the second transition series ranging from yttrium to cadmium; and
  the third transition series ranging from hafnium to mercury.

By extension, it is possible to incorporate into the transition metals elements possessing an incomplete f subshell (called deep transition elements), these metals corresponding to the family of lanthanides and actinides.

As an example of phosphates that can be used, mention may be made of iron phosphates, such as $LiFe_{x1}Mn_{1-x1}PO_4$ where $0 \leq x_1 \leq 1$, cobalt phosphates, such as $LiCoPO_4$, and mixtures thereof. These materials have an olivine-type structure.

As examples of transition metal oxides, mention may be made of $LiM_{x2}M'_{x3}Mn_{2-x2-x3}O_4$ where $0 \leq x_2 \leq 0.33$ and $0 \leq x_3 \leq 0.5$, M denoting Li or Mg and M' denoting a transition metal chosen from the group consisting of Ni, Co, Fe and Cr, $LiCo_{x4}Ni_{1-x4}O$ where $0 \leq x_4 \leq 1$, $LiAl_{x5}Ni_{1-x5}O_2$ where $0 \leq x_5 \leq 0.25$, and mixtures thereof.

The materials of formula $LiM_{x2}M'_{x3}Mn_{2-x2-x3}O_4$ have a structure of the spinel type.

Preferably, according to the invention, the positive active material is made of a transition metal oxide of formula $Li_{1+\epsilon}Mn_{2-\epsilon}O_4$ where $0 \leq \epsilon \leq 0.33$.

Thus, when this material is coupled with a negative active material such as $Li_4Ti_5O_{12}$, the electrochemical generator according to the invention delivers, between two electrodes of opposite sign, a voltage of around 2.5 V, thereby making it possible in particular to use less expensive electrolytes with a stability window reduced to 2.5 V, instead of 4 V in the case of conventional lithium-ion batteries.

According to the invention, the positive active material of each bipolar electrode may be an adsorptively active material, preferably an active carbon.

The separators, which ensure ionic conduction between two electrodes of opposite sign of a generator according to the invention, and which are especially placed on either side of each bipolar electrode, may be of various types.

According to a first variant, the separators may consist of a porous element containing a liquid lithium-ion conducting electrolyte.

The liquid electrolyte comprises, for example, a solvent or solvent mixture of the carbonate type, such as ethylene carbonate, propylene carbonate, dimethyl carbonate or diethyl carbonate, or a solvent or solvent mixture of the ether type, such as dimethoxyethane, dioxolane or dioxane, in which a lithium salt has been dissolved.

As examples, the lithium salt may be chosen from the group formed by $LiPF_6$, $LiClO_4$, $LiBF_4$, $LiAsF_6$, $LiCF_3SO_3$, $LiN(CF_3SO_2)_3$ and $LiN(C_2F_5SO_2)$.

According to a second variant, the separators may be a polymeric electrolyte containing a lithium salt.

As examples, the polymer may comprise polyacrylonitrile, poly(ethylene oxide), poly(vinylidene fluoride), a vinylidene fluoride/hexafluoropropylene copolymer or another polymer made ionically conductive by gelling, in the presence of a liquid electrolyte. The lithium salt may satisfy the same definition as that given above.

According to a third variant, the separators may consist of an inorganic lithium-ion conductive material chosen from the group formed by lithium phosphates or borates.

Preferably, the inorganic lithium-ion conductive material is $Li_3PO_{2.5}N_{0.3}$.

According to a fourth variant, the separators comprise a molten lithium salt.

According to a fifth variant, the separators may be formed from an ionic liquid comprising a dissolved lithium salt, such as the salts already mentioned above. In addition, the ionic liquid may preferably be chosen from the group formed by imidazolium salts, dialkylimidazolium salts, alkylpyridinium salts, dialkylpyridinium salts, chloroaluminate salts and alkylchloroaluminate salts.

Finally, according to a particularly advantageous embodiment of the invention, the electrochemical generator is characterized in that all the electrically conductive substrates (namely the substrates of the peripheral electrodes and the first and second substrate of each bipolar electrode) are made of aluminium and in that all the negative active materials of the said generator are formed from the same material, and all the positive active materials of the said generator are formed from the same material. Thus, it is possible to obtain a generator whose conductive substrates of the bipolar electrodes and of the peripheral electrodes are all made of aluminium with negative active materials compatible with the said aluminium. This makes it possible for the performance of the generator to be considerably improved over generators having copper substrates.

According to the invention, the lithium generator may also include a seal placed between the electrodes.

This seal may, for example, be based on polyolefins, such as polyethylene or polypropylene, or based on polytetrafluoroethylene.

Other features and advantages of the invention will become more apparent upon reading the following example, which is given of course by way of illustration but is not limiting, with reference to the appended drawing.

BRIEF DESCRIPTION OF THE DRAWINGS

FIG. 1 shows a lithium battery architecture according to U.S. Pat. No. 5,595,839.

FIG. 2 shows a lithium electrochemical generator architecture according to one particular embodiment of the invention.

DETAILED DESCRIPTION OF ONE EMBODIMENT OF THE INVENTION

EXAMPLE

1) Production of the Positive Electrode

Figure 3:
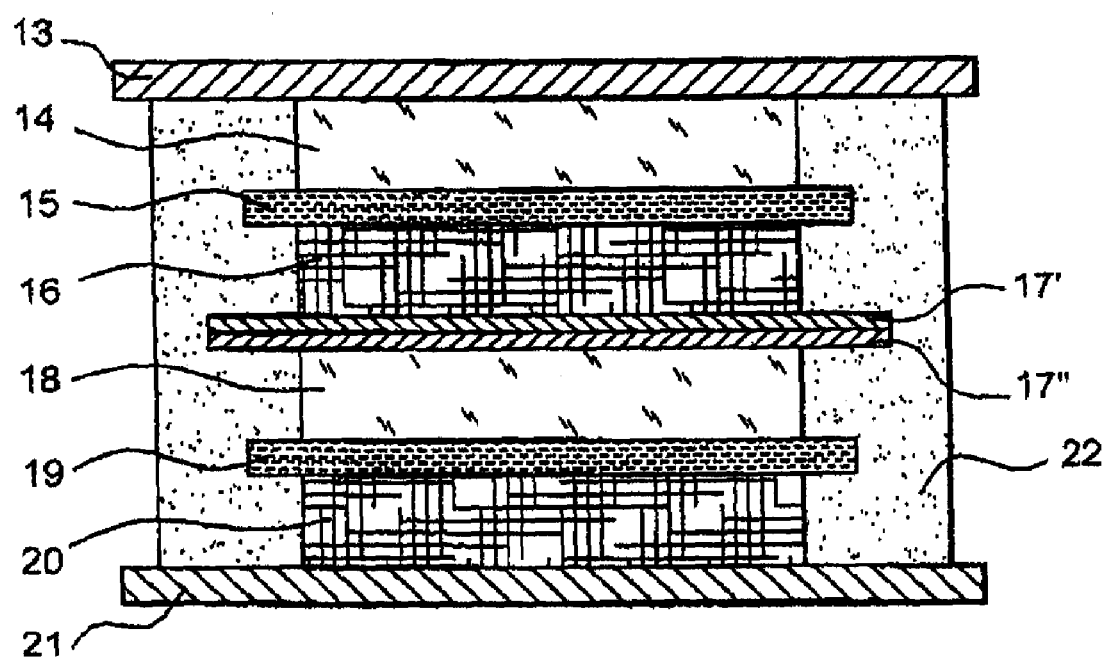
FIG. 3 shows a modified lithium electrochemical generator architecture according to a second embodiment of the invention.

A positive electrode with the following composition by mass:
- 85.5% $Li_{1.04}Mn_{1.96}O_4$ from Erachem Europe;
- 8.5% of super P carbon black from Erachem Europe; and
- 6.0% of SOLEF 6020 polyvinylidene fluoride (PVDF) from Solvay;

was produced according to the following protocol:
- the manganese oxide and carbon black powders were weighed separately;
- an N-methyl pyrrolidone (NMP) solution containing 12 wt % PVDF was prepared;
- the PVDF dissolved in NMP was introduced into a mixer and then NMP added to dilute it;
- the powders were progressively added, while continuing to mix;
- after obtaining a homogeneous mixture, an aluminium foil 20 microns thick was coated with this mixture using a micron-scale doctor blade; and
- the electrode thus obtained was dried in an oven at 80° C., initially for 1 hour at atmospheric pressure, and then for 2 hours under vacuum.

2) Production of the Negative Electrode

A negative electrode of the following composition by weight:
- 85.7% of $Li_4Ti_5O_{12}$ obtained by heating a $TiO_2/LiCO_3$ powder mixture in proportions of 5/2 at 900° C. for 15 hours in air;
- 8.3% of super P carbon black from Erachem Europe; and
- 6.0% of SOLEF 6020 PVDF from Solvay;

was produced according to the following protocol:
- the titanium oxide and carbon black powders were weighed separately;
- an NMP (N-methylpyrrolidone) solution containing 12 wt % PVDF was prepared;
- the PVDF dissolved in NMP was introduced into a mixer and then NMP added to dilute it;
- the powders were progressively added, while continuing to mix;
- after obtaining a homogeneous mixture, a 20 µm thick aluminium foil was coated therewith using a micron-scale doctor blade; and
- the electrode was dried in an oven at 80° C., initially for 1 hour at atmospheric pressure, and then 2 hours under vacuum.

3) Production of the Bipolar Electrode

The bipolar electrode was produced by applying the protocol for producing the negative electrode on the other side of a positive electrode produced according to section 1.

4) Production of the Bipolar Electrochemical Generator

After cutting the electrodes to the desired format, they were compressed under 2 t/cm² at room temperature.

The stack shown in FIG. 2 was produced in two steps. The first step in an uncontrolled atmosphere consisted in sealing, by means of two "U-shaped" polyethylene seals, the parallelepidal electrochemical generator along three sides by hot compression. The second step, carried out in an anhydrous atmosphere, consisted in activating the electrochemical generator by the addition of electrolyte along the fourth side and then in sealing off the storage battery along the latter side by means of two further polyethylene seals.

After this manufacturing process, what is obtained, in accordance with FIG. 2, is an electrochemical generator having a peripheral positive electrode comprising an aluminium conductive substrate 13 and a positive active layer 14 based on $Li_{1.04}Mn_{1.96}O_4$ and a peripheral negative electrode comprising an aluminium conductive substrate 21 and a negative active layer 20 based on $Li_4Ti_5O_{12}$ flanking a bipolar electrode comprising a positive active layer 18 and a negative active layer 16 on either side of a common aluminium conductive substrate 17 (corresponding to the first and second substrates in the case in which they form only a single piece). According to this embodiment, the substrate 17 forms a single piece and does not result from two substrates fixed together.

The peripheral electrodes are separated from the bipolar electrode by two separators 15, 19. The assembly is sealed by a seal 22, which may be composed of several elements.

Referring to FIG. 3, a modified lithium electrochemical generator architecture according to a second embodiment of the invention is shown. For convenience, identical elements are identified with the same reference numerals as used in connection with the first embodiment.

As shown in FIG. 3, the modified electrochemical generator includes a conductive substrate formed by substrates 17' and 17" that are fixed together. The negative active layer 16 and a positive active layer 18 cooperate with the substrates 17' and 17" to form a bipolar electrode.

Tests aiming to demonstrate in particular the stability of the storage battery obtained according to the invention were carried out. The results are given in FIG. 4A et seq.

Figure 4A:
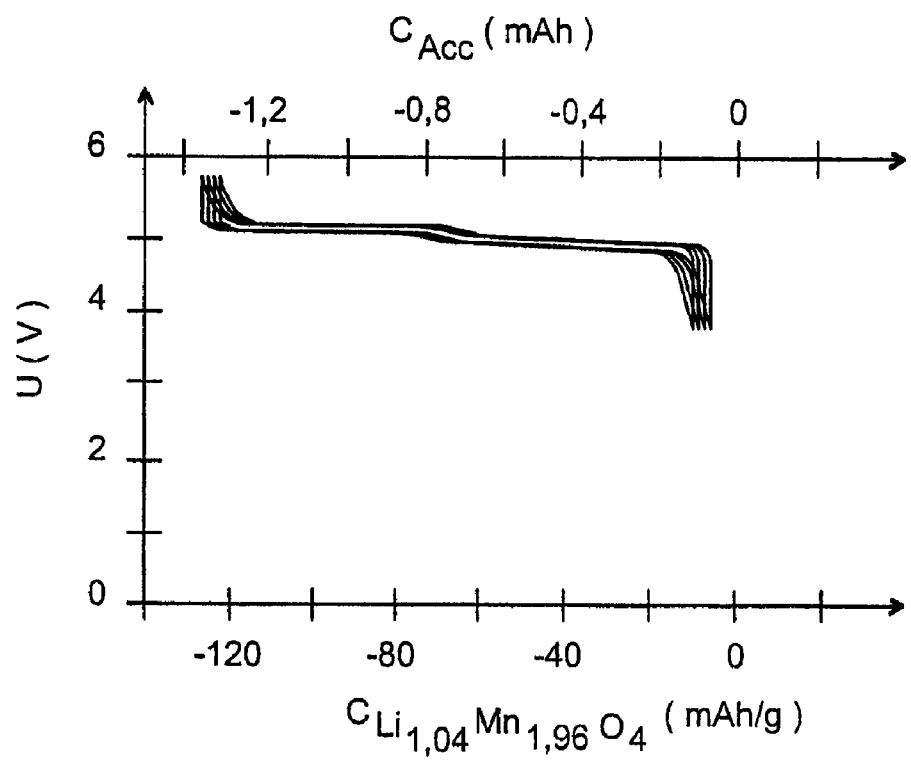
FIG. 4A shows the variation of voltage U (in V) at the terminals of an electrochemical generator produced according to the example explained below, as a function of the capacity of the electrochemical generator, denoted by $C_{ACC}$ (in mAh) or of the specific capacity of $Li_{1.04}Mn_{1.96}O_4$ denoted by $C_{Li_{1.04}Mn_{1.96}O_4}$ (mAh/g) over the course of charge/discharge cycles at a constant current of ±0.31 mA that are carried out under the C/4 condition, the C/4 condition corresponding to complete charging or discharging in 4 hours.
Figure 4B:
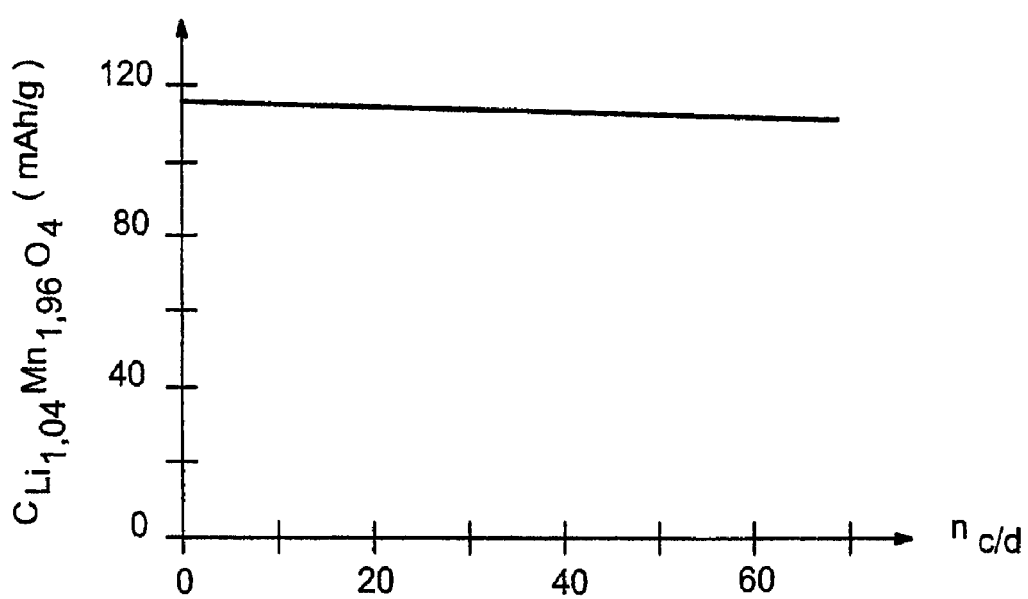
FIG. 4B shows the variation in the specific capacity of $Li_{1.04}Mn_{1.96}O_4$, denoted by $C_{Li_{1.04}Mn_{1.96}O_4}$ (in mAh/g) as a function of a number of charge/discharge cycles $n_{c/d}$ under the C/4 condition.

Thus, it may be seen in FIG. 4A that the charge/discharge curves are superposed, which denotes stability of the storage battery during the various cycles. This observation is confirmed by FIG. 4B, which shows that the specific capacity of $Li_{1.04}Mn_{1.96}O_4$ varies very slightly with an increasing number of cycles.

Figure 5A:
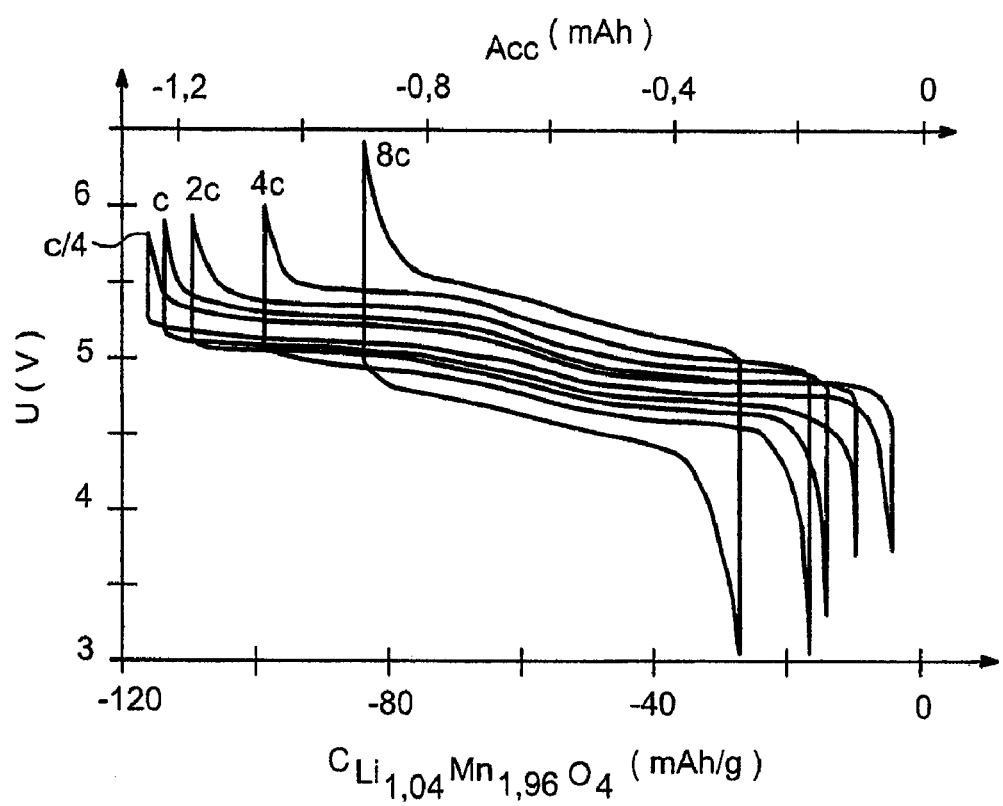
FIG. 5A shows the variation in the voltage U (in V) at the terminals of an electrochemical generator produced according to the example explained below, as a function of the capacity of the electrochemical generator denoted by $C_{Acc}$ (in mAh) or of the specific capacity of $Li_{1.04}Mn_{1.96}O_4$ denoted by $C_{Li_{1.04}Mn_{1.96}O_4}$ (in mAh/g) over the course of charge/discharge cycles that are carried out under different conditions (C/4, C, 2C, 40, 8C), the current applied for the said conditions being 0.31 mA, 1.24 mA, 2.48 mA, 4.96 mA and 9.92 mA, respectively.
Figure 5B:
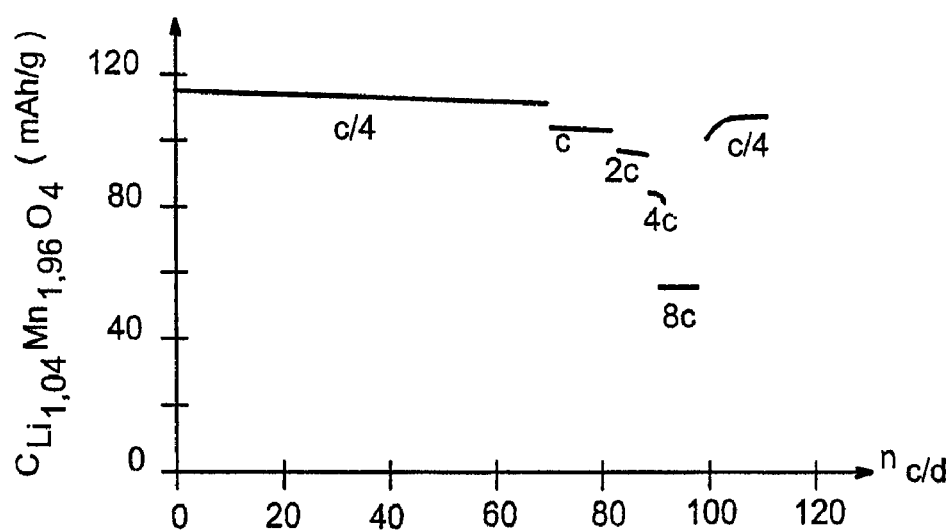
FIG. 5B shows the variation in the specific capacity of $Li_{1.04}Mn_{1.96}O_4$ denoted by $C_{Li_{1.04}Mn_{1.96}O_4}$ (in mAh/g) as a function of the number of charge/discharge cycles $n_{c/d}$ at constant current under various conditions (C/4, C, 2C, 4C and 8C).

FIGS. 5A and 5B show that more than 70% of the nominal capacity of the electrochemical generator is recovered under condition 4C and approximately 50% under condition 8C.

The invention claimed is:

1. Lithium electrochemical generator comprising:
   a positive peripheral electrode comprising an electrically conductive substrate to which a positive active layer, including a positive active material, adheres;
   a negative peripheral electrode comprising an electrically conductive substrate to which a negative active layer, including a negative active material, adheres;
   the positive peripheral electrode and the negative peripheral electrode being respectively located at opposite ends of the generator;
   at least one bipolar electrode comprising a positive active layer, including a positive active material, which adheres to a first electrically conductive substrate and comprising a negative active layer, including a negative active material, which adheres to a second electrically conductive substrate, the said first and second substrates being fixed together or forming a single substrate;
   two separators that are lithium ion conductors but electronic insulators, which flank each bipolar electrode;
   the said generator being characterized in that the said first and second electrically conductive substrates of the at least one bipolar electrode are made of identical or different materials chosen from the group formed by aluminium and its alloys and in that the negative active material of the negative active layer of the at least one bipolar electrode is a material not capable of forming an aluminium-lithium alloy with the material of the said second electrically conductive substrate.

2. Lithium electrochemical generator according to claim 1, characterized in that the negative active material of the at least one bipolar electrode has a potential for the intercalation of lithium into the said material above the potential for the formation of an aluminium-lithium alloy.

3. Lithium electrochemical generator according to claim 2, characterized in that the potential for intercalation of lithium into the negative active material of the at least one bipolar electrode is greater than 0.25 V.

4. Lithium electrochemical generator according to claim 1, characterized in that the electrically conductive substrate of at least one of the peripheral electrodes is made of a material chosen from a group consisting of aluminium and aluminium alloys.

5. Lithium electrochemical generator according to claim 1, characterized in that the negative active material of the at least one bipolar electrode is $Li_4Ti_5O_{12}$.

6. Lithium electrochemical generator according to claim 1, characterized in that the positive active material of the at least one bipolar electrode is chosen from a group consisting of transition metal phosphates or orthosilicates, carbon, transition metal oxides, whether substituted or not, and mixtures thereof.

7. Lithium electrochemical generator according to claim 6, characterized in that the transition metal phosphate is chosen from the group formed by $LiFe_{x1}Mn_{1-x1}PO_4$ where $0 \leq x_1 \leq 1$ and $LiCoPO_4$ and mixtures thereof.

8. Lithium electrochemical generator according to claim 6, characterized in that the transition metal oxide is chosen from the group formed by $LiM_{x2}M'_{x3}Mn_{2-x2-x3}O_4$ where $0 \leq x_2 \leq 0.33$ and $0 \leq x_3 \leq 0.5$, M denoting Li or Mg or M' denoting a transition metal chosen from the group consisting of Ni, Co, Fe and Cr, $LiCo_{x4}Ni_{1-x4}O_2$ where $0 \leq x_4 \leq 1$, $LiAl_{x5}Ni_{1-x5}O_2$ where $0 \leq x_5 \leq 0.25$, and mixtures thereof.

9. Lithium electrochemical generator according to claim 6, characterized in that the transition metal oxide is $Li_{1+\epsilon}Mn_{2-\epsilon}O_4$ where $0 \leq \epsilon \leq 0.33$.

10. Lithium electrochemical generator according to claim 1, characterized in that the positive active material of the at least one bipolar electrode is an adsorptively active material.

11. Lithium electrochemical generator according to claim 10, characterized in that the positive active material is an active carbon.

12. Lithium electrochemical generator according to claim 1, characterized in that the separators are formed from a porous element containing a liquid lithium-ion conductive electrolyte.

13. Lithium electrochemical generator according to claim 1, characterized in that the separators are formed from a polymeric electrolyte containing a lithium salt.

14. Lithium electrochemical generator according to claim 1, characterized in that the separators are formed from an inorganic lithium-ion conductive material chosen from the group formed by lithium phosphates and borates.

15. Electrochemical generator according to claim 14, characterized in that the inorganic lithiumion conductive material is $Li_3PO_{2.5}N_{0.3}$.

16. Electrochemical generator according to claim 1, characterized in that the separators comprise a molten lithium salt.

17. Electrochemical generator according to claim 1, characterized in that the separators are formed by an ionic liquid containing a dissolved lithium salt.

18. Lithium electrochemical generator according to claim 17, characterized in that the ionic liquid is chosen from the group formed by imidazolium salts, dialkylimidazolium salts, alkylpyridinium salts, dialkylpyridinium salts, chloroaluminate salts and alkylchloroaluminate salts.

19. Electrochemical generator according to claim 1, characterized in that all the electrically conductive substrates are made of aluminium and in that all the negative active materials of the said generator are formed from the same material, and all the positive active materials of the said generator are formed from the same material.

* * * * *